(12) United States Patent
Kim et al.

(10) Patent No.: US 8,216,694 B2
(45) Date of Patent: Jul. 10, 2012

(54) COATING COMPOSITION FOR STEEL SHEETS HAVING ZINC AND ZINC ALLOY COATING LAYER, METHOD FOR FORMING COATING LAYER USING THE COATING COMPOSITION AND STEEL SHEET HAVING THE COATING LAYER FORMED THEREOF

(75) Inventors: Young Geun Kim, Jeollanam-do (KR); Ha Sun Park, Jeollanam-do (KR); Sang Min Lee, Jeollanam-do (KR); Si Youl Choun, Jeollanam-do (KR); Yong Woon Kim, Jeollanam-do (KR); Jae Ryung Lee, Jeollanam-do (KR)

(73) Assignee: Posco, Pohang (KR)

( * ) Notice: Subject to any disclaimer, the term of this patent is extended or adjusted under 35 U.S.C. 154(b) by 66 days.

(21) Appl. No.: 12/674,527

(22) PCT Filed: Jul. 29, 2008

(86) PCT No.: PCT/KR2008/004420
§ 371 (c)(1),
(2), (4) Date: May 5, 2010

(87) PCT Pub. No.: WO2009/028801
PCT Pub. Date: Mar. 5, 2009

(65) Prior Publication Data
US 2011/0165434 A1    Jul. 7, 2011

(30) Foreign Application Priority Data

Aug. 24, 2007 (KR) .................. 10-2007-0085448
Dec. 26, 2007 (KR) .................. 10-2007-0138044

(51) Int. Cl.
*B32B 15/08* (2006.01)
*C09D 167/00* (2006.01)

(52) U.S. Cl. ........ 428/658; 428/632; 428/626; 428/657; 428/629; 428/640

(58) Field of Classification Search .................. None
See application file for complete search history.

(56) References Cited

U.S. PATENT DOCUMENTS

| 4,762,572 A | 8/1988 | Mady et al. |
| 5,149,566 A | 9/1992 | Morton et al. |
| 5,415,702 A | 5/1995 | Bishop et al. |

(Continued)

FOREIGN PATENT DOCUMENTS

JP    8006183 A    5/1987

(Continued)

*Primary Examiner* — Jennifer McNeil
*Assistant Examiner* — Vera Katz
(74) *Attorney, Agent, or Firm* — The Webb Law Firm (57) ABSTRACT

A coating composition for zinc- and zinc alloy-coated steel sheets includes: 1 to 30% by weight of hypophosphorous acid, 0.1 to 10% by weight of manganese, 0.01 to 5% by weight of a polyvinyl compound, zinc oxide and the balance of water, and further comprises 20% by weight or less of alcohol, when necessary, wherein the zinc oxide is included in such a content that, when 50 Ml (milliliters) of the coating composition is neutralized and titrated with 0.1N NaOH, the NaOH used for the neutralization titration is present in an amount of 10.0 Ml (milliliters) or less, and a content of free acid in the coating composition is adjusted to such an amount that, when 50 Ml (milliliters) of the coating composition is neutralized and titrated with 0.1N NaOH, the NaOH used for the neutralization titration is present in an amount of 10.0 Ml (milliliters) or less. The coating film formed on the steel sheet using the coating composition shows excellent properties such as lubricating property, adhesion and coating removal property, and also has a fine surface appearance.

5 Claims, 5 Drawing Sheets

U.S. PATENT DOCUMENTS

| | | |
|---|---|---|
| 6,773,803 B2 * | 8/2004 | Lee et al. ............... 428/323 |
| 6,902,766 B1 | 6/2005 | Kucera |
| 2004/0101629 A1 * | 5/2004 | Baumgart et al. ......... 427/407.1 |
| 2005/0031894 A1 * | 2/2005 | Klos et al. ............... 428/659 |

FOREIGN PATENT DOCUMENTS

| | | |
|---|---|---|
| JP | 11335865 A | 12/1999 |
| JP | 2000199074 A | 7/2000 |
| JP | 2004285468 A | 10/2004 |
| JP | 2006161152 A | 6/2006 |
| KR | 1990-0004962 A | 4/1990 |
| KR | 1999-0063384 A | 7/1999 |
| KR | 10-0003194 * | 1/2004 |
| KR | 1020090020840 A | 8/2007 |
| KR | 2006-135682 B1 | 11/2007 |
| KR | 100782720 * | 11/2007 |

* cited by examiner

COATING COMPOSITION FOR STEEL SHEETS HAVING ZINC AND ZINC ALLOY COATING LAYER, METHOD FOR FORMING COATING LAYER USING THE COATING COMPOSITION AND STEEL SHEET HAVING THE COATING LAYER FORMED THEREOF

TECHNICAL FIELD

The present invention relates to a coating composition for forming a coating film on a zinc- and zinc alloy-coated steel sheet, a method for forming a coating film using the same, and a zinc- and zinc alloy-coated steel sheet having a coating film formed according to the method, and more particularly, to a coating composition for forming a coating film on a zinc- and zinc alloy-coated steel sheet, the coating film showing excellent properties such as lubricating property and adhesion and coating removal property and also having a fine surface appearance, a method for forming a coating film using the same, and a zinc- and zinc alloy-coated steel sheet having a coating film formed according to the method.

BACKGROUND ART

Zinc- and zinc alloy-coated steel sheets includes a galvanizd steel sheet, an electro-galvanized steel sheet, a zinc alloy electroplated steel sheet, a galvannealed steel sheet, etc.

The zinc- and zinc alloy-coated steel sheets have an excellent ability to protect the steel sheet themselves due to the galvanic behavior of a zinc coating layer.

In particular, a content of iron (Fe) in the galvannealed steel sheet (hereinafter, referred to as "GA steel sheet") is varied according to the alloying degree, but the GA steel sheet has a more base standard electrode potential than Fe (−0.44 V) when Fe in the GA steel sheet is usually present in a content of 9 to 12% by weight. In this case, when a zinc coating layer is formed on the GA steel sheet, the GA steel sheet has an excellent ability to protect steel sheets the to the galvanic behavior of the zinc coating layer, and it is inexpensive and easy to be manufactured. As a result, the GA steel sheet is mainly used as a steel sheet for automobiles.

However, the zinc- and zinc alloy-coated steel sheet has a disadvantage that the coating layer has a poor formability since the coating layer has a high friction force, that is, a high friction coefficient since the coating layer has a large contact area with a die and is easily adhered to a de during its press forming due to the very rough and soft coating layer.

Therefore, the zinc- and zinc alloy-coated steel sheet itself may be cracked since a high friction load is applied to the steel sheet during the press forming of the steel sheet, which leads to the deteriorated productivity and workability in the manufacture of automobiles.

In this regard, a flash steel sheet may be used, for example, as the steel sheet whose formability is improved by decreasing its friction coefficient.

The flash steel sheet is a steel sheet obtained by thinly electroplating an alloy such as Fe—Zn, Fe—Mn or P—Fe alloy (a coating weight of 3,000 to 5,000 mg (milligrams)/m$^2$ (square meter)) onto a zinc- and zinc alloy-coated steel sheet so that Fe or P can be present in a content of 90% by weight or more.

However, it is undesirable for automobile manufacture's to use the flash steel sheet in the aspect of the manufacturing cost due to its high manufacturing cost.

A phosphate-based, lubricant-coated steel sheet may also be used as the steel sheet whose formability is improved by decreasing its friction coefficient.

The lubricant-coated steel sheet is prepared by coating a zinc- and zinc alloy-coated steel sheet with a phosphate solution including a 2- or 3-component metal compound of nickel, manganese and zinc, all of which have excellent workability, and has an advantage that it has a superior formability and is inexpensive.

However, since phosphoric acid is weakly acidic, it is impossible to lower a free acid content of the phosphate solution below a predetermined extent. As a result, a large amount of free phosphoric acid remains in the coating layer.

The free phosphoric aid acts to degrade adhesion of adhesives, which are used to attach inner/outer plate of an automobile or the steel sheets in the hem flange of an automobile when an automobile body is assembled in the car manufacturing plant.

That is to say, the free phosphoric acid functions to degrade the adhesion between a surface of the steel sheet and the adhesives by weakening a binding force of the adhesives to the steel sheet, which leads to the degraded adhesion of the adhesives.

Therefore, the phosphate-based, lubricant-coated steel sheet (in the form of coated type), which is not washed after the coating, has good properties such as weldability, paintability and corrosion resistance including formability, but has a problem that the adhesion of the adhesives is very poor since a large amount of free phosphoric acid remains on the coating layer.

Korean Patent Application No. 2006-135682 filed by the present inventors proposes a steel sheet whose adhesion is improved while maintaining formability, weldability, paintability and corrosion resistance.

However, it was revealed that the adhesion of the steel sheet proposed in the Korean Patent Application No. 2006-135682 is rather degraded in the use of some adhesives.

When the assembly line of the automobile body is completed, it should also be subjected to alkaline degreasing and conversion coating processes, followed by an electrodepositing process. However, when a lubricant coating film is not completely removed from the steel sheets during the alkaline degreasing process, a grain shapes or size distribution in a conversion coating film is made irregular, which leads to the defects in a surface of the coating film, for example the formation of pinholes or craters during the electrodepositing process.

Furthermore, when a lubricant-coated steel sheet is manufactured using a roll water, a wettability of a coating solution may be degraded in respect to the steel sheet, and a lot of fine stripes may appear in a surface of the lubricant-coated steel sheet when the coating solution is dried slowly.

The present invention is designed to solve the problems of the prior art, and therefore it is an object of the present invention to provide a coating composition for zinc- and zinc alloy-coated steel sheets capable of forming a coating film on a zinc- and zinc alloy-coated steel sheet, the coating film having excellent properties such as adhesive adhesion, alkaline coating removal property and lubricating property.

Also, it is another object of the present invention to provide a method for forming a coating film on a surface of a zinc- and zinc alloy-coated steel sheet, the coating film having excellent properties such as adhesive adhesion, alkaline coating removal property and lubricating property.

It is still another object of the present invention to provide a zinc, and zinc alloy-coated steel sheet including a coating film having excellent properties such as adhesive adhesion, alkaline coating removal property and lubricating property.

It is still another object of the present invention to provide a coating composition for zinc- and zinc alloy-coated steel sheets capable of forming a coating film on a zinc- and zinc alloy-coated steel sheet, the coating film having a fine surface appearance, as well as the excellent properties such as adhesive adhesion, alkaline coating removal property and lubricating property.

It is still another object of the present invention to provide a method for forming a mating film on a surface of a zinc- and zinc alloy-coated steel sheet, the coating film having a fine surface appearance, as well as the excellent properties such as adhesive adhesion, alkaline coating removal property and lubricating property.

It is yet another object of the present invention to provide a zinc- and zinc alloy-coated steel sheet inducing a coating film having a fine surface appearance, as well as the excellent properties such as adhesive adhesion, alkaline mating removal property and lubricating property.

SUMMARY OF THE INVENTION

Hereinafter, exemplary embodiments of the present invention will be described in detail.

According to an aspect of the present invention, there is provided a coating composition for zinc- and zinc alloy-coated steel sheets including: 1 to 30% by weight of hypophosphorous add, 0.1 to 10% by weight of manganese, 0.01 to 5% by weight of a polyvinyl compound, zinc oxide and the balance of water, and further comprises 20% by weight or less of alcohol, when necessary, wherein the zinc oxide is included in such a content that, when 50 ml (milliliters) of the coating composition is neutralized and titrated with 0.1N NaOH, the NaOH used for the neutralization titration is present in an amount of 10.0 ml (milliliters) or less, and a content of free acid in the mating composition is adjusted to such an amount that, when 50 ml (milliliters) of the coating composition is neutralized and titrated with 0.1N NaOH, the NaOH used for the neutralization titration is present in an amount of 10.0 ml (milliliters) or less.

According to another aspect of the present invention, there is provided a method for forming a coating film on a zinc, and zinc alloy-coated steel sheet, the method including: coating a zinc- and zinc alloy-coated steel sheet with the coating composition for zinc- and zinc alloy-coated steel sheets so that a coating weight of the coating composition coated onto the coating layer is in a range of 100 to 2000 mg (milligrams)/m² (square meters); and drying the steel sheet at a temperature of 30 to 200° C. (centigrades) after the coating of the steel sheet with the coating composition.

According to still another aspect of the present invention, there is provided a zinc- and zinc alloy-coated steel sheet having a coating film formed according to the method for forming a coating film on the zinc- and zinc alloy-coated steel sheet, wherein a coating weight of the coating composition coated onto the coating layer is in a range of 100 to 2000 mg (milligrams)/m² (square meters) per one side of the steel sheet.

As described above, the coating film formed on the zinc- and zinc alloy-coated steel sheet from the coating composition according to the present invention shows excellent properties such as lubricating property, adhesion and coating removal property, and also has a fine surface appearance.

BEST MODE FOR CARRYING OUT THE INVENTION

Hereinafter, exemplary embodiment of the present invention will be described in detail.

The coating composition (a film-forming composition) according to one exemplary embodiment of the present invention, which is used to form a coating film, particularly a coating film including a polyvinyl compound as an additive in addition to phosphorus-zinc-manganese, on a zinc- and zinc alloy-coated steel sheet, includes hypophosphorous acid having a very high oxidation power as a main component and has a controlled content of free acid. Therefore, the coating film formed on the zinc- and zinc alloy-coated steel sheet using the coating composition of the present invention shows an excellent adhesion, as well as lubricating property and coating removal property.

The coating composition according to one exemplary embodiment of the present invention includes hypophosphorous aid, manganese, a polyvinyl compound, zinc oxide and the balance of water. Here, the coating composition has a controlled concentration of free acid, and it may further include alcohol, when necessary.

In addition, wax, a lubricant and the like may be optionally added to the coating composition according to one exemplary embodiment of the present invention.

Of course, in addition to the wax and the lubricant, the coating composition according to one exemplary embodiment of the present invention may include components that may be optionally added thereto, when necessary, by those skilled in the art.

For the coating composition according to one exemplary embodiment of the present invention, hypophosphorous acid and manganese are the factors that determine a lubricating property of the coating composition. Here, the hypophosphorous acid is mixed in a range of 1 to 30% by weight, preferably 5 to 15% by weight, and more preferably 5 to 10% by weight, based on the total weight of the composition, and the manganese is mixed in a range of 0.1 to 10% by weight, preferably 0.1 to 1% by weight, and more preferably 0.1 to 0.5% by weight, based on the total weight of the composition.

When the content of the hypophosphorous aid is less than 1% by weight, the lubricating property of the composition may be degraded. On the contrary, when the content of the hypophosphorous acid exceeds 30% by weight, it is difficult to handle a coating solution, and this may be uneconomic since a large amount of zinc oxide should be added to reduce a concentration of free acid.

In consideration of the lubricating property and economical efficiency, the content of the hypophosphorous aid is in a range of 1 to 30% by weight, preferably 5 to 15% by weight, and more preferably 5 to 10% by weight.

When the content of the manganese is less than 0.1% by weight, the lubricating property of the composition may be degraded, whereas, when the content of the manganese exceeds 10% by weight, the manganese is not completely dissolved in the composition, and this is uneconomic.

In consideration of the lubricating property and economical efficiency, the content of the manganese is in a range of 0.1 to 10% by weight, preferably 0.1 to 1% by weight, and more preferably 0.1 to 0.5% by weight.

Meanwhile, in order to ensure a suitable amount of manganese in the coating composition, metal manganese may be directly dissolved in the composition, or manganese carbonate or potassium permanganate may be converted into an amount of manganese, and dissolved in the composition.

The polyvinyl compound is added to improve the adhesion of steel sheets, and includes materials such as polyvinyl acetate (PVAc), polyvinyl alcohol (PVAl), polyvinyl butyral (PVB), polyvinyl formal (PVF) and polyvinyl ether (PVE), and they may be used alone or in combinations thereof.

When the polyvinyl compound is added in a content of 0.01% or less, the adhesion of steel sheets is not improved, whereas, when the polyvinyl compound is added in a content of 5% or more, this is uneconomic, and the workability of steel sheets may be seriously degraded since bubbles are increasingly formed in the coating solution, and the adhesion of steel sheets is not improved any more even when the polyvinyl compound is further added.

Figure 1:
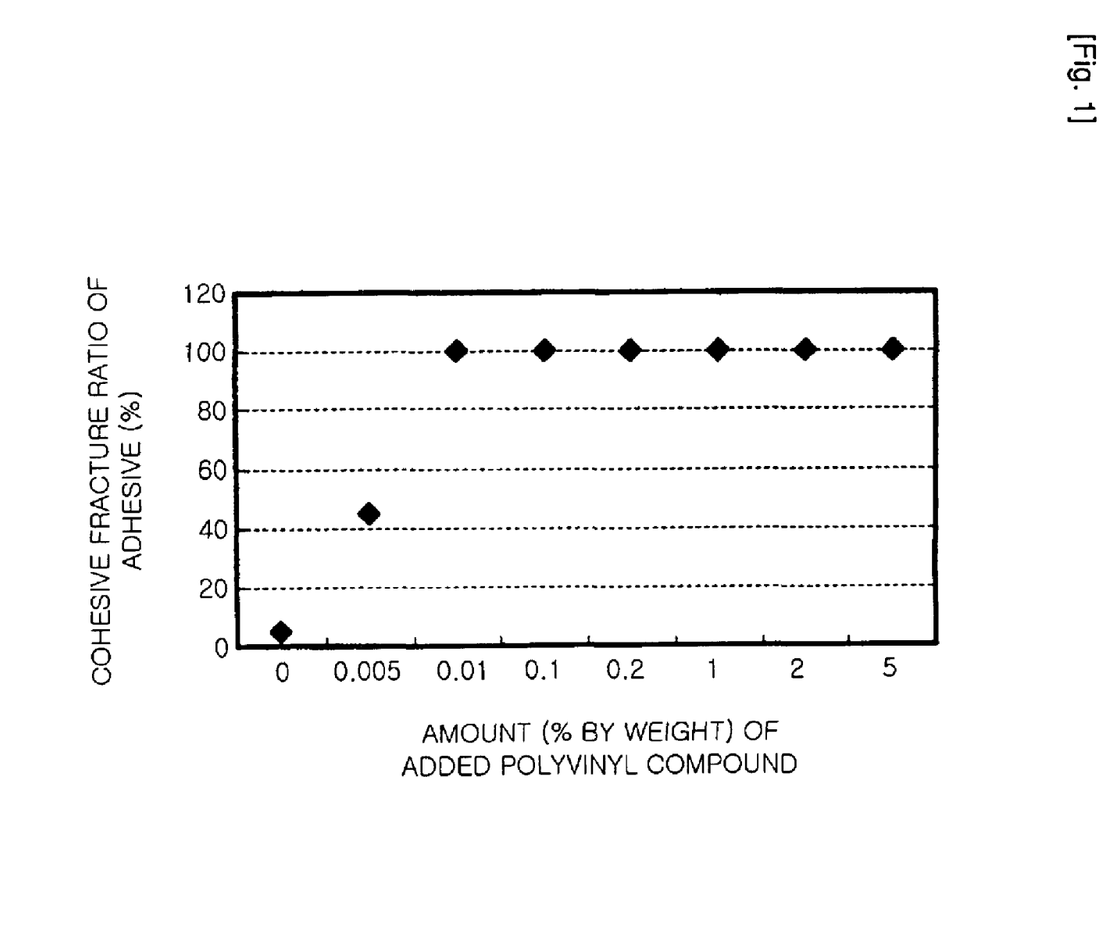
FIG. 1 is a graph illustrating the changes in a cohesive fracture ratio of an adhesive according to the amount of an added polyvinyl compound in a coating composition.

FIG. 1 is a graph illustrating the changes in a cohesive fracture ratio of an adhesive according to the changes in concentration of a polyvinyl compound (polyvinyl alcohol) in a coating composition.

As shown in FIG. 1, it is revealed that the coating composition has excellent adhesion to the steel sheets since the cohesive fracture ratio of an adhesive reaches 100% when the concentration of the polyvinyl alcohol is 0.05% by weight or more, but the coating composition has constant adhesion to the steel sheets when the polyvinyl alcohol is present in a content of 0.5% by weight or more.

In consideration of the adhesion, economical efficiency and workability, the content of the polyvinyl compound is in a range of 0.01 to 5% by weight, preferably 0.05 to 0.5% by weight, and more preferably 0.05 to 0.1% by weight.

The zinc oxide is added to minimize a content of free aid in the composition. In this case, the zinc oxide may be added to the coating composition in such a content that, when 50 ml (milliliters) of the coating composition is neutralized and titrated with 0.1N NaOH, the NaOH used for the neutralization titration is present in an amount of 10.0 ml (milliliters) or less, and preferably 8.3 to 8.8 ml (milliliters).

Therefore, a content of free and in the coating composition according to one exemplary embodiment of the present invention is adjusted to such an amount that, when 50 ml (milliliters) of the coating composition is neutralized and titrated with 0.1N NaOH, the NaOH used for the neutralization titration is present in an amount of 10.0 ml (milliliters) or less, and preferably 8.3 to 8.8 ml (milliliters).

Also, since the free acid is used to determine pH of a coating solution, and a concentration of the free acid is changed according to the amount of added zinc oxide, the zinc oxide should be added, as described above, to maintain the concentration of the free acid to a concentration level of 10 ml (milliliters) or less. In this case, 10 ml (milliliters) of the free acid corresponds to a coating solution of pH 2.5.

When the concentration of the free acid exceeds 10 ml (milliliters), pH of the coating solution is reduced to pH 2.5 or less, which leads to the increased reactivity of the coating solution. As a result, a coating film may not be completely removed by an alkaline degreasing solution. However, when the pH of the coating solution is increased to pH 3 or more, the coating removal property of the coating film may be improved but a precipitate may start to be formed in the coating solution. As a result, the use of the coating solution may be difficult in the used in the long term die to the poor stability of the coating solution.

Figure 2:
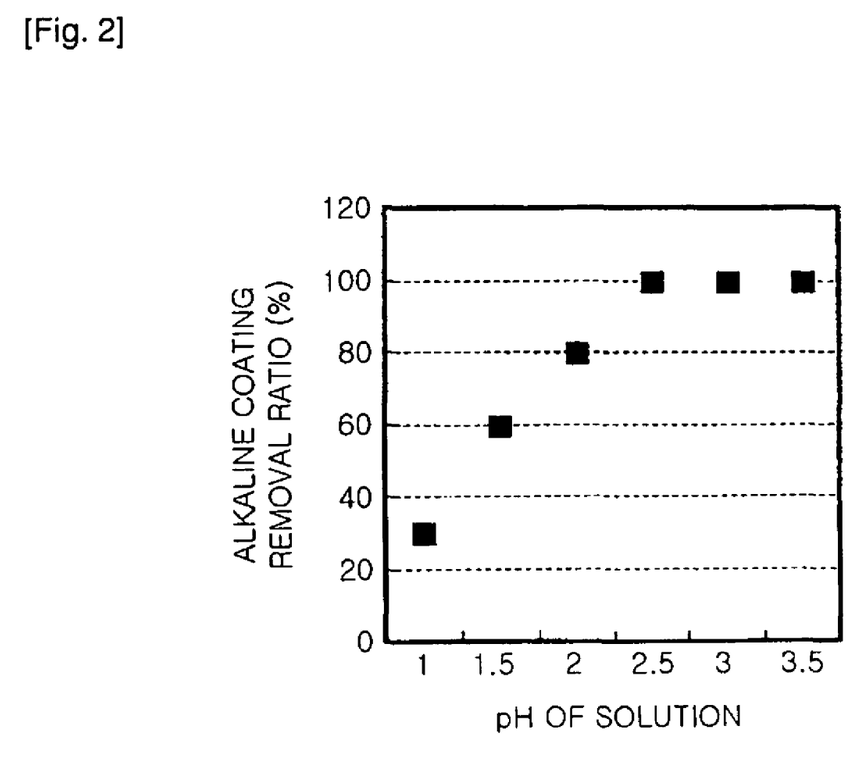
FIG. 2 is a graph illustrating the effects of pH of an alkaline solution on coating removal property of a coating film.

FIG. 2 is a graph illustrating the effects of pH of an alkaline solution on coating removal property of a coating film. In FIG. 2, it is seen that the coating removal property of the coating film does not reach 100% when the pH of the coating solution is less than 2.5.

Figure 3:
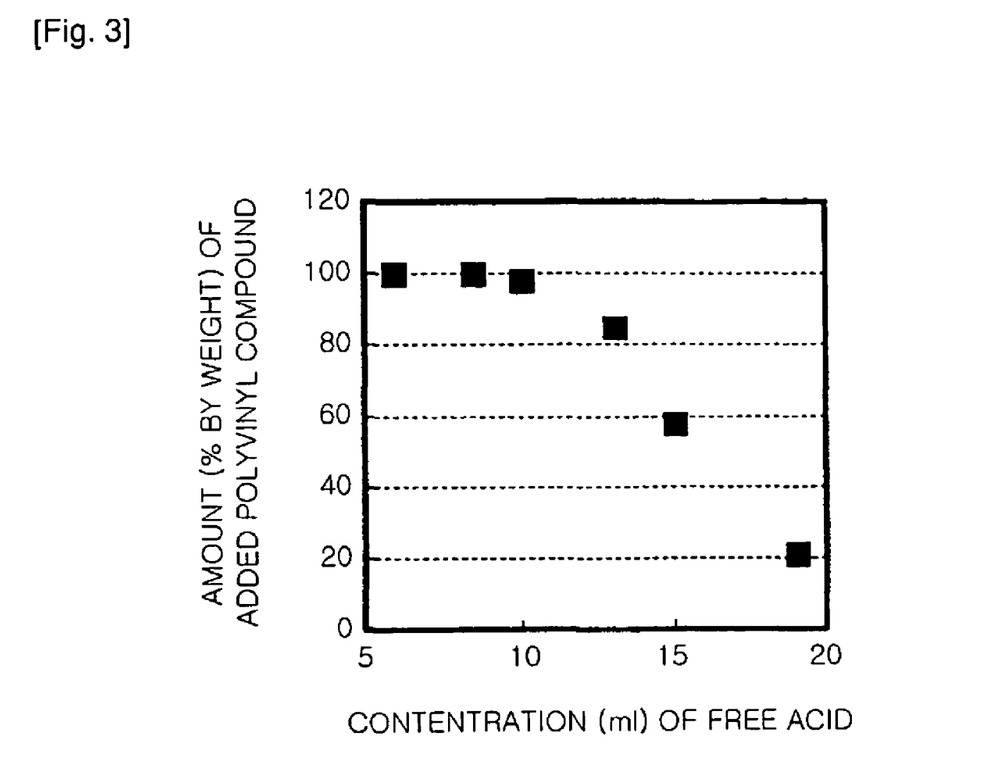
FIG. 3 is a graph illustrating the changes in a cohesive fracture ratio of an adhesive according to the changes in a concentration of free acid in a coating composition.

FIG. 3 is a graph illustrating the changes in a cohesive fracture ratio of an adhesive according to the changes in a concentration of free add in a coating composition. In FIG. 3, a horizontal axis on the graph represents an amount of 0.1N NaOH used to neutralize and titrate 50 ml (milliliters) of the coating composition.

As shown in FIG. 3, when the content of the free aid in the coating solution exceeds 10 ml (milliliters), the cohesive fracture ratio of the adhesive may be low.

For convenience sake, the content of the free add in the coating composition refers to an amount of 0.1N NaOH used when the coating composition is titrated with 0.1N NaOH in this specification, but the present invention is not particularly limited thereto. It goes without saying that the coating composition may be titrated with other alkaline solutions to have the same acid concentration.

When the content of the free acid in 50 ml (milliliters) of the coating composition exceeds a concentration corresponding to 10 ml (milliliters) of 0.1N NaOH, the adhesion of the coating film, i.e a phosphorus-zinc-manganese film, to a zinc- and zinc alloy-coated steel sheet may be degraded.

Also, it is more preferred to use the smaller content of the free acid in the coating composition, but there is no limitation on the lowest content of the free acid. However, when the content of the free acid in 50 ml (milliliters) of the coating composition is less than a concentration corresponding to 8.3 ml (milliliters) of 0.1N NaOH, the adhesion of a lubricant-coated film may be degraded and a precipitate may also be formed in the coating solution due to the low reactivity of the coating composition to the coated steel sheet.

In order to roughly adjust a content of the free aid in 50 ml (milliliters) of the coating composition to a concentration level less than a concentration corresponding to 10 ml (milliliters) of 0.1N NaOH, the zinc oxide in the coating composition is used in a nearly saturated solubility.

For the coating composition (film-forming composition) according to one exemplary embodiment of the present invention, the content of the free acid in 50 ml (milliliters) of the coating composition may be adjusted to a concentration level less than a concentration corresponding to 10 ml (milliliters) of 0.1N NaOH, for example, by adding 2% by weight of zinc oxide to the composition including 7% by weight of hypophosphorous acid, but the present invention is not particularly limited thereto.

Meanwhile, when alcohol is added to the film-forming composition according to one exemplary embodiment of the present invention, the spreadability and wettability of the coating solution are improved with its increased surface tension, and a drying rate may be enhanced due to the high volatility of the coating solution. Therefore, it is possible to obtain a coating film having a uniform and fine appearance without any of stripes or stains in the coating process.

In consideration of the above-mentioned characteristics, the coating composition according to one exemplary embodiment of the present invention may further include 20% by weight or less of alcohol.

The content of alcohol is preferably in a range of 3.0 to 20% by weight, and more preferably in a range of 5 to 10% by weight.

When the content of the alcohol exceeds 20% by weight, the aging of the composition may be accelerated. The alcohol is preferably added in a content greater than 5% by weight so as to ensure sufficient surface tension and drying rate, thereby obtaining a coating film having a fine surface appearance.

Ethyl alcohol may be generally used as the alcohol.

Figure 4:
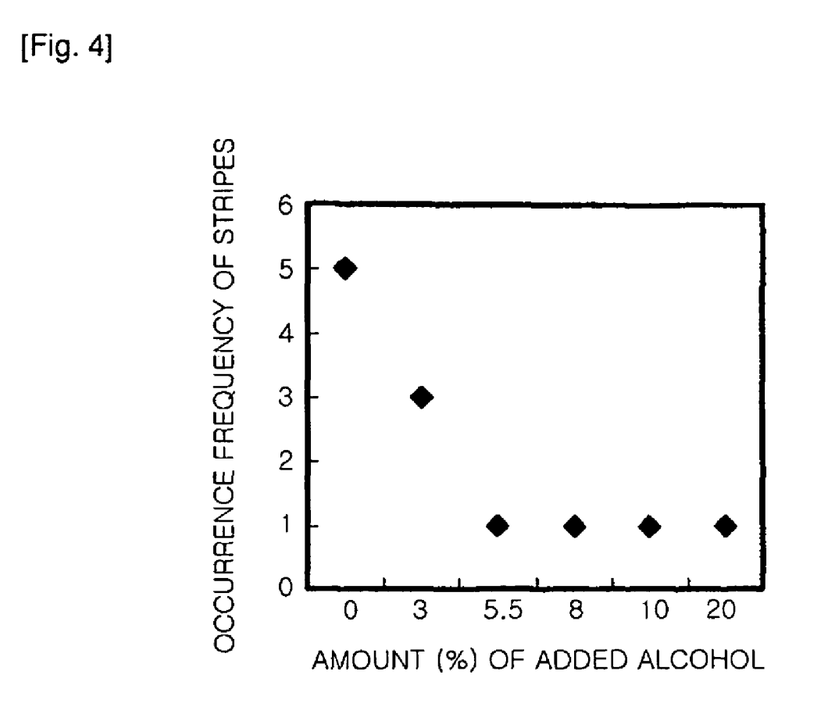
FIG. 4 is a graph illustrating the occurrence frequency of stripes in a surface of a steel sheet according to the concentration of alcohol in a coating solution.

FIG. 4 is a graph illustrating the effects of an increasing concentration of alcohol in a coating solution on a surface appearance of a steel sheet. An occurrence frequency of stripes on a vertical axis is set to any of levels. In this case, the higher level means an increasing occurrence of stripes. Here, Level 5 represents the occurrence of too many stripes, Level 4 represents the occurrence of many stripes, Level 3 represents the occurrence of moderate stripes, Level 2 represents the occurrence of slight stripes, and Level 1 represents no occurrence of stripes.

As shown in FIG. 4, it is revealed that there is no occurrence of stripes when greater than 5.0% of alcohol is added to the coating solution.

The coating composition awning to one exemplary embodiment of the present invention includes, for example, 10% by weight of hypophosphorous acid, 2% by weight of zinc oxide, 0.5% by weight of manganese, 0.1% by weight of a polyvinyl compound, 9% by weight of ethyl alcohol and the balance of water, but the present invention is not particularly limited thereto. Here, free aid in the coating composition are adjusted to such an amount that, when 50 ml (milliliters) of the coating composition is neutralized and titrated with 0.1N NaOH, the NaOH used for the neutralization titration is present in an amount of 10.0 ml (milliliters) or less.

When the coating composition prepared thus is used to form a coating film on a coated steel sheet, a coating film showing excellent properties such as adhesion, lubricating property and coating removal property and having a fine surface appearance may be obtained.

According to the present invention, a coating film, particularly a film inducing a polyvinyl compound as an additive in addition to phosphorus-zinc-manganese, is formed on a coated steel sheet by coating a steel sheet, particularly a zinc- and zinc alloy-coated steel sheet with the film-forming composition according to one exemplary embodiment of the present invention and drying the steel sheet.

A zinc- and zinc alloy-coated steel sheet is coated with the film-forming composition according to one exemplary embodiment of the present invention so that a coating weight of the coating composition coated onto the coating layer can be in a range of 100 to 2000 mg (milligrams)/m$^2$ (square meters), preferably 100 to 1000 mg (milligrams)/m$^2$ (square meters), and more preferably 200 to 400 mg (milligrams)/m$^2$ (square meters).

One surface or both surfaces of the coated steel sheet may be coated with the coating composition according to one exemplary embodiment of the present invention.

When a coating weight of the coating composition coated onto the coating layer is less than 100 mg (milligrams)/m$^2$ (square meters), the intrinsic lubricating property of the lubricant-coated steel sheet may be degraded, whereas, when a coating weight of the coating composition coated onto the coating layer is greater than 2,000 mg (milligrams)/m$^2$ (square meters), there is no further improvement in the lubricating property and degreasing property of the coating composition, and the weldability and paintability of the steel sheet may be deteriorated.

Figure 5:
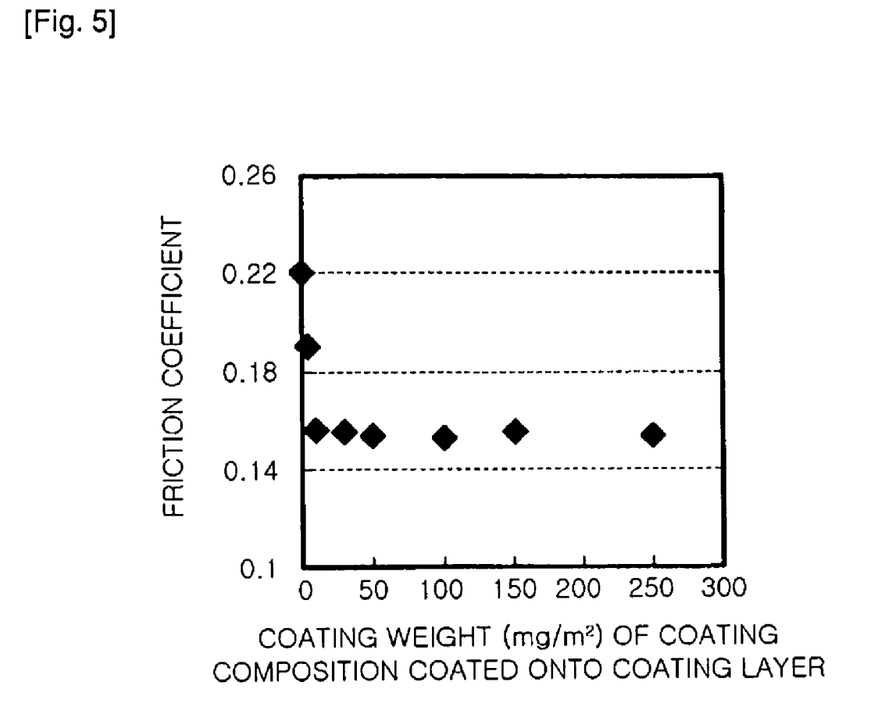
FIG. 5 is a graph illustrating the changes in a friction coefficient according to the changes in a coating weight of the coating composition coated onto a coating layer.

FIG. 5 is a graph illustrating the changes in a friction coefficient according to the changes in a coating weight of the coating composition coated onto a coating layer.

As shown in FIG. 5, it is revealed that the coating film has a low friction coefficient within an inventive coating weight range of the coating composition coated onto the coating layer per one side of the steel sheet.

In consideration of the lubricating property, weldability, degreasing property and paintability, a coating weight of the coating composition coated onto the coating layer is in a range of 100 to 2000 mg (milligrams)/m$^2$ (square meters), preferably 100 to 1000 mg (milligrams)/m$^2$ (square meters), and more preferably 200 to 400 mg (milligrams)/m$^2$ (square meters) per one side of the steel sheet.

Meanwhile, the coating may be carried out, for example, by using a roll water, or by spraying a coating composition onto a surface of a steel sheet. However, the steel sheet should not be washed after the coating process in any case. The coating may be generally carried out at a room temperature. After the coating process, the steel sheet may be dried at a temperature of 30 to 200° C. (centigrades), and preferably 70 to 100° C. (centigrades). When the steel sheet is dried at a temperature of 30° C. (centigrades) or below, the coating film is not completely dried, whereas, when the steel sheet is dried at a temperature of 200° C. (centigrades) or above, this is uneconomic.

In consideration of the drying property and economical efficiency, a drying temperature is in a range of 30 to 200° C. (centigrades), and preferably 70 to 100° C. (centigrades).

A zinc- and zinc alloy-coated steel sheet inducing a coating film, in which a dried coating weight of the film-forming composition coated onto the dried coating film is in a range of 100 to 2000 mg (milligrams)/m$^2$ (square meters), preferably 100 to 1000 mg (milligrams)/m$^2$ (square meters), and more preferably 200 to 400 mg (milligrams)/m$^2$ (square meters), shows excellent properties such as formability, adhesion and coating removal property, and also has a fine appearance.

Hereinafter, the present invention will be described in more detail with reference to the exemplary embodiments of the present invention.

Example 1

Test samples were prepared by cutting a GA steel sheet having a thickness of 0.8 mm (millimeters) into pieces (100× 150 mm (millimeters)), degreasing each of the cut GA steel sheets, coating one surface of each GA steel sheet with a coating composition (film-forming composition), which is prepared according to components and their contents as listed in the following Table 1, at a condition of coating weights of the coating composition as listed in the following Table 1 using a bar water (#3), and drying each of the GA steel sheets at 50° C. (centigrades) to form a phosphate film.

A content of free acid in the coating composition as listed in the following Table 1 was represented by an amount of 0.1N NaOH used for the titration of 50 ml (millimeters) of the coating composition.

Zinc oxide was mixed with coating composition in such an amount that a content of free add in 50 ml (millimeters) of the coating composition corresponds to the contents as listed in the following Table 1.

Then, the prepared composition was evaluated for the adhesion, friction coefficient and economical efficiency, and the results were listed in the following Table 1.

The adhesion was evaluated, as follows. A test sample was cut into 3 pieces (100×25 mm (millimeters)), and the cut test samples were degreased with acetic alcohol, dipped into a R303-PX2 washing oil, and kept for 24 hours.

After the 24 hour dipping, only a piece (25×25 mm (millimeters)) of the test sample was coated in a thickness of 1 mm (millimeter) with a hem flange adhesive (PV5308, commercially available from Cemedine Henkel Co., Ltd., used in Toyota Motor Corp.), and dried at 150° C. (centigrades) for 20 minutes, followed by performing a shear tensile strength test on the test sample at a rate of 50 mm (millimeters)/min. After the shear tensile strength test, a cohesive fracture ratio of the adhesive was determined by observing a fracture mode of the test sample.

A cohesive fracture ratio of the used PV5308 hem flange adhesive should reach 100%, which indicates that there is no interface delamination between the adhesive and the steel sheet at all.

A coating composition including 8.1% by weight of phosphoric acid was used instead of hypophosphorous acid in Conventional example and some Comparative examples.

The hypophosphorous acid was used in most of the Comparative examples and Inventive examples.

A friction coefficient of a test sample was measured by cutting a test sample into a piece (45×150 mm (millimeters)), coating the cut test sample with a washing oil (commercially available P-DBH), applying a load of 650 kgf to a die (3.5 cm (centimeters)×3.5 cm (centimeters)) to draw the test sample at a drawing rate of 1000 mm (millimeters)/min., and dividing the load in drawing by a load of 650 kgf. Ea h of the test samples was measured three times for friction coefficient, and their average values are listed in the following Table 1.

Meanwhile, the performances of the coating composition were slightly improved when the hypophosphorous acid is present in a content of 30% by weight or more, the polyvinyl compound is present in a content of 5% by weight or more, the manganese is present in a content of 10% by weight or more, or a coating weight of the composition coated onto a coating layer is in a range of 2000 mg (milligrams)/m$^2$ (spare meters) or more. Therefore, the coating composition was determined to be uneconomic (X) when the coating composition includes one of the above-mentioned conditions.

TABLE 1

|  | Tn | Sc Ha (wt. %) | Mn (wt. %) | Fa (ml) | Pc (wt. %) | Cw (mg/m$^2$) | Fc | Af (%) | Ee | Re |
|---|---|---|---|---|---|---|---|---|---|---|
| Cx | 1 | — | 0.5 | 11.8 | — | 1000 | 0.155 | 0 | 0 | Ps |
| Cox | 2 | 5 | 0.1 | 8.3 | — | 90 | 0.198 | 30 | 0 | Hs |
|  | 3 | 7 | 0.1 | 8.8 | — | 530 | 0.159 | 50 | 0 | " |
|  | 4 | 31 | 0.5 | 8.5 | — | 1300 | 0.152 | 65 | X | " |
|  | 5 | 10 | 0.09 | 8.4 | — | 350 | 0.188 | 85 | 0 | " |
|  | 6 | 1 | 11 | 8.4 | — | 150 | 0.155 | 70 | X | " |
|  | 7 | 15 | 5 | 8.5 | — | 95 | 0.211 | 65 | 0 | " |
|  | 8 | 8 | 0.5 | 8.7 | — | 350 | 0.155 | 35 | 0 | " |
|  | 9 | — | 10 | 10.9 | 0.05 | 250 | 0.156 | 45 | 0 | Ps |
|  | 10 | — | 0.5 | 11.3 | 2 | 1200 | 0.157 | 75 | 0 | " |
|  | 11 | 5 | 0.1 | 8.3 | 0.4 | 90 | 0.185 | 100 | 0 | Hs |
|  | 12 | 7 | 0.1 | 8.8 | 6 | 2000 | 0.158 | 100 | X | " |
|  | 13 | 31 | 0.5 | 8.5 | 1.5 | 1400 | 0.152 | 100 | X | " |
|  | 14 | 30 | 11 | 8.4 | 0.5 | 350 | 0.153 | 100 | X | " |
|  | 15 | 20 | 10 | 8.4 | 0.009 | 1100 | 0.154 | 85 | 0 | " |
|  | 16 | 1 | 5 | 8.5 | 0.1 | 2100 | 0.151 | 100 | X | " |
|  | 17 | 15 | 1 | 8.3 | 1 | 95 | 0.179 | 100 | 0 | " |
| Ix | 1 | 1 | 0.1 | 8.3 | 0.01 | 100 | 0.156 | 100 | 0 | " |
|  | 2 | 30 | 0.5 | 8.4 | 0.7 | 300 | 0.154 | 100 | 0 | " |
|  | 3 | 10 | 10 | 8.3 | 5 | 200 | 0.155 | 100 | 0 | " |
|  | 4 | 10 | 0.5 | 9.4 | 0.3 | 300 | 0.151 | 100 | 0 | " |
|  | 5 | 15 | 0.1 | 10.0 | 0.2 | 200 | 0.152 | 100 | 0 | " |
|  | 6 | 30 | 5 | 9.8 | 5 | 300 | 0.150 | 100 | 0 | " |
|  | 7 | 7 | 10 | 8.5 | 0.1 | 400 | 0.148 | 100 | 0 | " |
|  | 8 | 10 | 10 | 9.5 | 0.01 | 400 | 0.149 | 100 | 0 | " |
|  | 9 | 30 | 10 | 10.0 | 5 | 2000 | 0.145 | 100 | 0 | " |
|  | 10 | 1 | 0.6 | 8.7 | 0.01 | 200 | 0.157 | 100 | 0 | " |

In the Table 1, Tn: Test sample No., Sc: Solution composition, Ha(wt %): Hypophosphorous aid (wt %), Mn(wt %): Manganese (wt %), Fa(ml): Free acid (ml), Pc(wt %): Polyvinyl compound (wt %), Cw(mg/m$^2$): Coating weight of composition (mg/m$^2$), Fc: Friction coefficient, Af(%): Adhesive's cohesive fracture ratio (%), Ee: Economical efficiency, Re: Remark, Cx: Conventional example, Cox: Comparative examples, Ix: Inventive examples, Ps: Phosphoric acid solution, and Hs: Hypophosphorous acid solution.

As listed in the Table 1, it was revealed that the Conventional example 1 coated with the solution that includes phosphoric acid but not a polyvinyl compound has a low friction coefficient, but has a very poor adhesion with 0% cohesive fracture ratio of the adhesive since the free aid in the coating solution is present in a large amount of 11.8 ml (milliliters).

Also, as seen from the Comparative examples 2 to 8, it is impossible to ensure the adhesion of the coating composition when the hypophosphorous aid is used and the free acid is present in a concentration of 10 ml (milliliters) or less, but the polyvinyl compound is not added to the coating solution.

In addition, as in the Comparative examples 9 and 10, it was seen that it is impossible to ensure 100% cohesive fracture ratio of an adhesive when a concentration of the free acid is high due to the use of the conventional phosphate solution although a suitable amount of the polyvinyl compound is added to the coating solution.

Furthermore, as in the Comparative examples 11 to 17, it might be expected that one of the friction coefficient, adhesion and economical efficiency may be degraded when one of the contents of the hypophosphorous aid, the polyvinyl compound and the manganese, and the coating weight of the composition coated onto the coating layer is out of the range of the present invention although the free aid is present in a concentration of 10 ml (milliliters) or less.

When the coating composition is present in an amount of less than 200 mg (milligrams)/m² (square meters) (Comparative examples 2, 7, 11, 17), it might be expected that the formability of the coating composition may de deteriorated die to its high friction coefficient.

Meanwhile, as in the Inventive examples 1 to 10, it was seen that the coating composition has excellent properties with 100% cohesive fracture ratio of the PV5308 adhesive and a friction coefficient of 0.157 or less when the contents of the hypophosphorous aid, the manganese and the polyvinyl compound, the concentration of the free aid, and the coating weight of the coating composition coated onto a coating layer satisfy the requirements of the present invention.

Example 2

Test samples were prepared by cutting a GA steel sheet having a thickness of 0.8 mm (millimeters) into pieces (100× 150 mm (millimeters)), degreasing each of the cut GA steel sheets, coating one surface of each GA steel sheet with a coating composition (film-forming composition), which is prepared according to components and their contents as listed in the following Table 2, at a condition of coating weights of the coating composition as listed in the following Table 2 using a bar water (#3), and drying each of the GA steel sheets at 50° C. (centigrades) to form a phosphate film.

A content of free acid in the coating composition as listed in the following Table 2 was represented by an amount of 0.1N NaOH used for the titration of 50 ml (millimeters) of the coating composition.

Zinc oxide was mixed with coating composition in such an amount that a content of free acid in 50 ml (millimeters) of the coating composition corresponds to the contents as listed in the following Table 2.

Then, the prepared composition was evaluated for the adhesion, friction coefficient and economical efficiency, and the results were listed in the following Table 2.

The adhesion was evaluated, as follows. A test sample was cut into 3 pieces (100×25 mm (millimeters)), and the cut test samples were degreased with acetic alcohol, dipped into a R303-PX2 washing oil, and kept for 24 hours.

After the 24 hour dipping, only a piece (25×25 mm (millimeters)) of the test sample was coated in a thickness of 1 mm (millimeter) with a hem flange adhesive (PV5308, commercially available from Cemedine Henkel Co., Ltd., used in Toyota Motor Corp.), and dried at 150° C. (centigrades) for 20 minutes, followed by performing a shear tensile strength test on the test sample at a rate of 50 min (millimeters)/min. After the shear tensile strength test, a cohesive fracture ratio of the adhesive was determined by observing a fracture mode of the test sample.

A cohesive fracture ratio of the used PV5308 hem flange adhesive should reach 100%, which indicates that there is no interface delamination between the adhesive and the steel sheet at all.

A coating composition including 8.1% by weight of phosphoric acid was used instead of hypophosphorous acid in Conventional example and some Comparative examples.

The hypophosphorous and was used in most of the Comparative examples and Inventive examples.

A friction coefficient of a test sample was measured by cutting a test sample into a piece (45×150 mm (millimeters)), coating the cut test sample with a washing oil (commercially available P-DBH), applying a load of 650 kgf to a die (3.5 cm (centimeters)×3.5 cm (centimeters)) to draw the test sample at a drawing rate of 1000 mm (millimeters)/min., and dividing the load in drawing by a load of 650 kgf. Each of the test samples was measured three times for friction coefficient, and their average values are listed in the following Table 2.

The coating removal property was evaluated, as follows. A degreasing solution of 3% of 4292L A and 0.3% of 4292L B, both of which are used in a domestic H automobile company, was prepared, and a test sample was upped in the solution at 50° C. (centigrades) for 2 minutes, washed, and dried to quantify a P component, which remains in a surface of a steel sheet, by using an ICP, and a coating removal ratio was calculated by dividing an amount of P after the degreasing process by an amount of P before the degreasing process.

A roll water simulator was used to perform a simulation test on stripes formed during the coating process. First, a steel sheet was coated more than ten times with a solution that is free from alcohol, and set to Level 5 when stripes our most abundantly on the steel sheet. Then, the steel sheet was graded according to the occurrence frequency of stripes on the steel sheet coated with a solution with an increasing content of alcohol to 20% by weight. An image analysis system was used to exactly grade the stripes on a surface of the steel sheet.

Meanwhile, the performances of the coating composition were slightly improved when the hypophosphorous acid is present in a content of 30% by weight or more, the polyvinyl compound is present in a content of 5% by weight or more, the manganese is present in a content of 10% by weight or more, or a coating weight of the composition coated onto a coating layer is in a range of 2000 mg (milligrams)/m² (square meters) or more. Therefore, the coating composition was proven to be uneconomic (X) when the coating composition includes one of the above-mentioned conditions.

TABLE 2

|  | Tn | Ha (wt %) | Mn (wt %) | Fa (ml) | Sc Pc (wt %) | Ac (wt %) | Cw (mg/m²) | Fc | Af (%) | Cr (%) | Ls | Ee | Re |
|---|---|---|---|---|---|---|---|---|---|---|---|---|---|
| Cx | 1 | — | 0.5 | 11.8 | — | — | 1000 | 0.155 | 0 | 50 | 5 | 0 | Ps |
| Cox | 2 | 5 | 0.1 | 8.3 | — | 0 | 90 | 0.198 | 30 | 100 | 5 | 0 | Hs |
|  | 3a | 7 | 0.1 | 8.8 | — | 1 | 530 | 0.159 | 50 | 100 | 5 | 0 | " |
|  | 4a | 31 | 0.5 | 8.5 | — | 2 | 1300 | 0.152 | 65 | 100 | 5 | X | " |
|  | 5a | 10 | 0.09 | 8.4 | — | 3 | 350 | 0.188 | 85 | 100 | 4 | 0 | " |
|  | 6a | 1 | 11 | 8.4 | — | 4 | 150 | 0.155 | 70 | 100 | 3 | X | " |
|  | 7a | 15 | 5 | 8.5 | — | 5 | 95 | 0.211 | 65 | 100 | 2 | 0 | " |

TABLE 2-continued

| | Tn | Sc Ha (wt %) | Mn (wt %) | Fa (ml) | Pc (wt %) | Ac (wt %) | Cw (mg/m$^2$) | Fc | Af (%) | Cr (%) | Ls | Ee | Re |
|---|---|---|---|---|---|---|---|---|---|---|---|---|---|
| | 8a | 8 | 0.5 | 8.7 | — | 5.5 | 350 | 0.155 | 35 | 100 | 1 | 0 | " |
| | 9a | — | 10 | 10.9 | 0.05 | 7 | 150 | 0.156 | 45 | 80 | 1 | 0 | Ps |
| | 10a | — | 0.5 | 11.3 | 2 | 13 | 1200 | 0.157 | 75 | 60 | 1 | 0 | " |
| | 11a | 5 | 0.1 | 8.3 | 0.4 | 20 | 90 | 0.185 | 100 | 100 | 1 | 0 | Hs |
| | 12a | 7 | 0.1 | 8.8 | 6 | 8 | 2000 | 0.158 | 100 | 100 | 1 | X | " |
| | 13a | 31 | 0.5 | 8.5 | 1.5 | 13 | 1400 | 0.152 | 100 | 100 | 1 | X | " |
| | 14a | 30 | 11 | 8.4 | 0.5 | 12 | 350 | 0.153 | 100 | 100 | 1 | X | " |
| | 15a | 20 | 10 | 8.4 | 0.009 | 9 | 1100 | 0.154 | 85 | 100 | 1 | 0 | " |
| | 16a | 1 | 5 | 8.5 | 0.1 | 10 | 2100 | 0.151 | 100 | 100 | 1 | X | " |
| | 17a | 15 | 1 | 8.3 | 1 | 0 | 95 | 0.179 | 100 | 100 | 5 | 0 | " |
| Ix | 1a | 1 | 0.1 | 8.3 | 0.01 | 5.5 | 100 | 0.156 | 100 | 100 | 1 | 0 | " |
| | 2a | 30 | 0.5 | 8.4 | 0.7 | 10 | 300 | 0.154 | 100 | 100 | 1 | 0 | " |
| | 3a | 10 | 10 | 8.3 | 5 | 20 | 200 | 0.155 | 100 | 100 | 1 | 0 | " |
| | 4a | 10 | 0.5 | 9.4 | 0.3 | 13 | 300 | 0.151 | 100 | 100 | 1 | 0 | " |
| | 5a | 15 | 0.1 | 10.0 | 0.2 | 7 | 200 | 0.152 | 100 | 100 | 1 | 0 | " |
| | 6a | 30 | 5 | 9.8 | 5 | 10 | 300 | 0.150 | 100 | 100 | 1 | 0 | " |
| | 7a | 7 | 10 | 8.5 | 0.1 | 9 | 400 | 0.148 | 100 | 100 | 1 | 0 | " |
| | 8a | 10 | 10 | 9.5 | 0.01 | 18 | 400 | 0.149 | 100 | 100 | 1 | 0 | " |
| | 9a | 30 | 10 | 10.0 | 5 | 14 | 2000 | 0.145 | 100 | 100 | 1 | 0 | " |
| | 10a | 1 | 0.6 | 8.7 | 0.01 | 6 | 200 | 0.157 | 100 | 100 | 1 | 0 | " |

In the Table 2, Tn: Test sample No., Sc: Solution composition, Ha(wt %): Hypophosphorous acid (wt %), Mn(wt %): Manganese (wt %), Fa(ml): Free acid (ml), Pc(wt %): Polyvinyl compound (wt %), Ac(wt %): Alcohol (wt), Cw(mg/m$^2$): Coating weight of composition (mg/m$^2$), Fc: Friction coefficient, Af(%): Adhesive's cohesive fracture ratio (%), Cr(%): Coating removal ratio (%), Ls: Levels of stripes, Ee: Economical efficiency, Re: Remark, Cx: Conventional example, Cox: Comparative examples, Ix: Inventive examples, Ps: Phosphoric acid solution, and Hs: Hypophosphorous acid solution.

As listed in the Table 2, it was revealed that the Conventional example 1 coated with the solution that includes phosphoric acid but not a polyvinyl compound has a low friction coefficient, but has a very poor adhesion with 0% cohesive fracture ratio of the adhesive since the free add in the coating solution is present in a large amount of 11.8 ml (milliliters).

Also, as seen from the Comparative examples 2 and 3a to 8a, it is impossible to ensure the adhesion of the coating composition when the hypophosphorous acid is used and the free acid is present in a concentration of 10 ml (milliliters) or less, but the polyvinyl compound is not added to the coating solution.

In addition, as in the Comparative examples 9a and 10a, it was seen that it is impossible to ensure 100% cohesive fracture ratio of an adhesive when a concentration of the free add is high due to the use of the conventional phosphate solution although a suitable amount of the polyvinyl compound is added to the coating solution.

Furthermore, as in the Comparative examples 11a to 17a, it might be expected that one of the properties such as friction coefficient, adhesion and economical efficiency may be degraded when one of the contents of the hypophosphorous aid, the polyvinyl compound and the manganese, and the coating weight of the composition coated onto the coating layer is out of the range of the present invention although the free aid is present in a concentration of 10 ml (milliliters) or less.

When the coating composition is present in an amount of less than 200 mg (milligrams)/m$^2$ (square meters) (Comparative examples 2, 7a, 11a, 17a), it might be expected that the formability of the coating composition may de deteriorated due to its high friction coefficient.

Also, it was seen that, when the amount of the free acid in the coating solution is less than 10 ml (milliliters) in the Comparative examples and Inventive examples, pH of the coating solution is greater than pH 2.5, and therefore it is possible to ensure 100% of a coating removal ratio, but when the amount of the free acid in the coating solution is greater than 10 ml (milliliters), the removal of the coating is not completely implemented with less than 100% of a coating removal ratio.

Furthermore, it was revealed that no stripes occur on a surface of the steel sheet when the alcohol in the coating solution is added in a content of greater than 5% by weight, but a surface appearance of the steel sheet is not fine due to the occurrence of stripes (Level 2) when the alcohol in the coating solution is added in a content of less than 5% by weight.

Meanwhile, as in the Inventive examples 1a to 10a, it was seen that the coating composition has excellent properties with 100% cohesive fixture ratio of the PV5308 adhesive and a friction coefficient of 0.157 or less when the contents of the hypophosphorous add, the manganese and the polyvinyl compound, the concentration of the free acid, and the coating weight of the mating composition coated onto a coating layer satisfy the requirements of the present invention.

The invention claimed is:

1. A zinc- and zinc alloy-coated steel sheet having a coating film formed with a coating composition for zinc- and zinc alloy-coated steel sheets comprising: 1 to 30% by weight of hypophosphorous acid, 0.1 to 10% by weight of manganese, 0.01 to 5% by weight of a polyvinyl compound, zinc oxide and the balance of water, wherein the zinc oxide is comprised in such a content that, when 50 ml (milliliters) of the coating composition is neutralized and titrated with 0.1N NaOH, the NaOH used for the neutralization titration is present in an amount of 10.0 ml (milliliters) or less, and a content of free acid in the coating composition is adjusted to such an amount that, when 50 ml (milliliters) of the coating composition is neutralized and titrated with 0.1N NaOH, the NaOH used for the neutralization titration is present in an amount of 10.0 ml (milliliters) or less, wherein a dried coating weight of the coating composition coated onto the coating layer is in a range of 100 to 2000 mg (milligrams)/m$^2$ (square meters) per one side of the steel sheet.

2. The zinc- and zinc alloy-coated steel sheet of claim 1, wherein a dried coating weight of the coating composition coated onto the coating layer is in a range of 200 to 400 mg (milligrams)/m$^2$ (square meters) per one side of the steel sheet.

3. The zinc- and zinc alloy-coated steel sheet of claim 1, wherein the coating composition further comprises 20% by weight or less of alcohol, based on the total weight of the coating composition.

4. The zinc- and zinc alloy-coated steel sheet of claim 3, wherein the content of the alcohol is in a range of 3.0 to 20% by weight.

5. The zinc- and zinc alloy-coated steel sheet of claim 3, wherein the content of the alcohol is in a range of 5.0 to 10% by weight.

* * * * *